June 7, 1966 R. J. HOFMEISTER ETAL 3,255,311

TV RECEIVER

Filed Nov. 1, 1962 3 Sheets-Sheet 1

INVENTORS.
Richard J. Hofmeister
George F. Whitney
By Mueller and Aichele
Attys

June 7, 1966 R. J. HOFMEISTER ETAL 3,255,311

TV RECEIVER

Filed Nov. 1, 1962 3 Sheets-Sheet 2

INVENTORS.
Richard J. Hofmeister
George P. Whitney
By: Mueller and Aichele
Attys June 7, 1966 R. J. HOFMEISTER ETAL 3,255,311

TV RECEIVER

Filed Nov. 1, 1962 3 Sheets-Sheet 3

INVENTORS.
Richard J. Hofmeister
George P. Whitney
By: Mueller and Aichele
Att'ys

United States Patent Office 3,255,311

Patented June 7, 1966

3,255,311

TV RECEIVER

Richard J. Hofmeister, Elk Grove Village, and George P. Whitney, Villa Park, Ill., assignors to Motorola, Inc., Chicago, Ill., a corporation of Illinois Filed Nov. 1, 1962, Ser. No. 234,809
5 Claims. (Cl. 178—7.9)

This application relates to television receivers and more particularly to a compact cabinet and mounting arrangement for a portable television receiver.

Portable television receivers have been provided with a handle for carrying the same from one place to another in a home or other area of use. Such receivers have included a frame on which the various electrical components of the receiver, including the receiver picture tube, are mounted. The frame and components are then placed in a cabinet which houses the operating structure and forms a support for carrying the receiver. Although attempts have been made to provide such a receiver which is compact and light weight, all receivers have been objectionably heavy due to the weight of the electrical components, frame and cabinet.

It is therefore an object of the present invention to provide a compact portable television receiver having a simple structural arrangement.

A further object is to provide a television receiver having a housing which serves as a frame for supporting a chassis and control panel and wherein the chassis and control panel serve to reinforce and strengthen the housing.

Another object of the invention is to provide a compact portable television receiver wherein the housing supports the picture tube, chassis and control elements, and forms the sole supporting unit for the television components.

Still another object of the invention is to provide a portable television receiver having a handle which is easily accessible and which retracts to a position out of the way when not used.

A feature of the invention is the provision of a television receiver including a two part plastic housing, the front part supporting the picture tube at the front of the housing, a chassis at the bottom, and a control panel at the top, and wherein the back part of the housing is secured to the front part and to the control panel to hold the same in firm assembly and avoid rattles initiated by sound from the loadspeaker of the receiver.

A further feature of the invention is the provision of a television receiver including a plastic housing supporting the receiver chassis at the bottom thereof and a control panel at the top thereof which supports the loadspeaker, tuner and other controls. The control panel and the chassis reinforce the housing, and the control panel also supports a telescopic handle arrangement for carrying the receiver and which is held in a retracted position when not used.

Another feature of the invention is the provision of a portable television receiver including a two-piece housing wherein a control panel is secured to the top of the housing and supports controls and a loadspeaker, and the rear housing part is secured to the top panel and engages the front portion with an interference fit which holds the two cabinet parts assembled and prevents vibration thereof resulting from sound produced at the loadspeaker of the receiver.

The invention is illustrated in the drawings wherein.

The portable television receiver of the invention includes a molded plastic housing having a main housing portion and a back cover. The main housing has a front wall with an opening against which a transparent safety panel is positioned, and the picture tube is positioned in the housing with the screen thereof viewed through the opening in the front wall. The picture tube is supported solely from the main housing. A chassis is positioned on the bottom wall of the main housing, and a control panel is secured to the under side of the top wall of the housing. The control panel supports a loudspeaker near the center thereof which emits sound through openings in the top wall of the housing. Controls including the tuner for the receiver are provided at opposite ends of the control panel and have operating elements extending through the top wall and accessible to the user of the receiver. A retractable handle is provided at the top of the receiver including arms extending through the top wall of the housing and through the control panel, and engage the control panel. The control panel is rigidly secured to the top wall to strengthen the same and to provide adequate support for carrying the receiver by engagement of the handle with the control panel. Springs are provided on the control panel for holding the handle in retracted positions when not in use, and the carrying portion of the handle is positioned in a recess on the top wall immediately in front of the sound openings. The back cover is supported at the bottom to the housing, and is shaped to surround the chassis and provide a compact housing configuration. The back cover is secured at the top to the control panel and has a portion providing an interference fit with a portion on the main housing so that the back cover and housing are held in rigid engagement at the top to prevent vibration resulting from the sound produced by the loudspeaker.

Figures 1, 2:
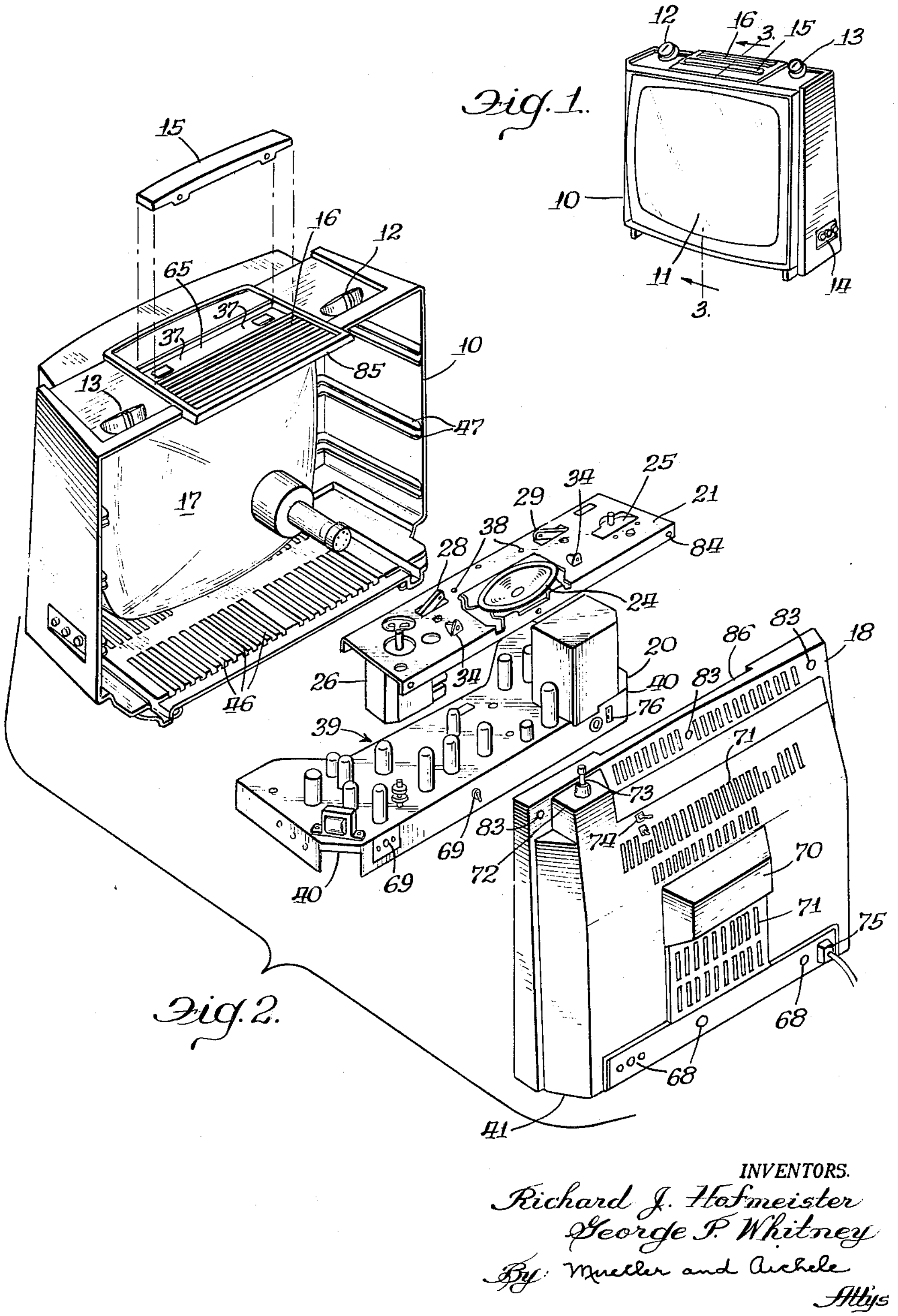
FIG. 1 is a perspective view showing the portable television receiver of the invention.
FIG. 2 is an exploded view showing the housing and the arrangements of parts therein.

Referring now to the drawings in FIG. 1 there is shown a television receiver including a housing 10 molded of plastic insulating material. The housing has a front wall with an opening covered by protective glass 11 through which the picture tube is viewed. Operating controls 12 and 13 are provided at the top of the housing and further controls 14 at one side of the housing. At the top of the housing is a retractable handle 15 which may be used to carry the portable receiver from one position to another. Back of the handle are openings 16 in the top wall of the housing through which sound from a loudspeaker mounted in the cabinet passes to be audible to the person viewing the picture on the receiver.

Figure 3:
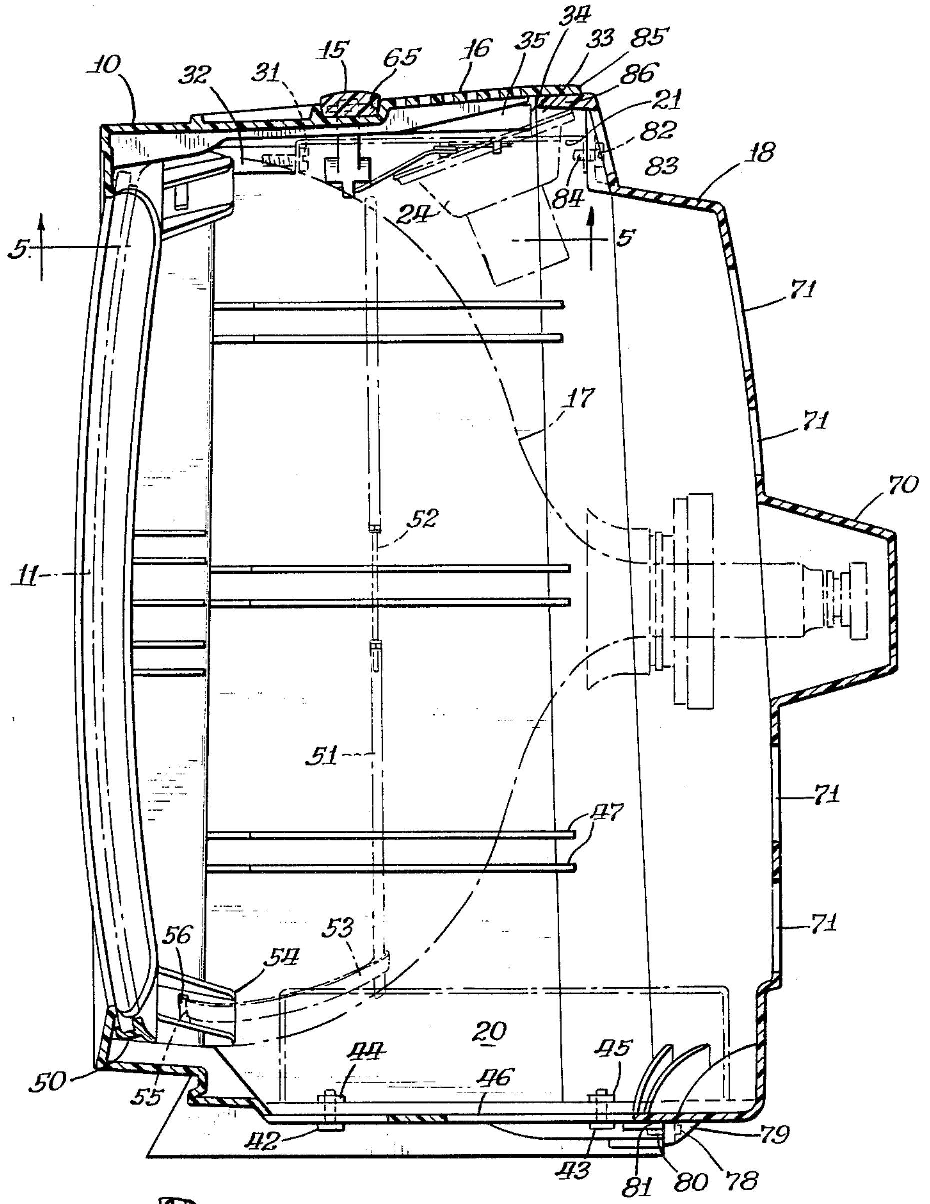
FIG. 3 is a side cross-sectional view of the assembled receiver.

The general construction of the receiver is shown in more detail in FIGS. 2 and 3, with FIG. 2 being an exploded view showing parts separated, and FIG. 3 being a side cross-sectional view. It is apparent from these figures that in addition to the main housing 10 there is a back cover 18 which cooperates with the main housing to completely enclose the parts of the receiver. The receiver includes a chassis 20 which rests on the bottom wall of the main housing. This includes most of the operating parts of the television receiver circuit. A control panel 21 is secured to the under side of the top wall of the housing 10, as shown in FIG. 3. The control panel supports a loudspeaker 24 in a central position directly below the openings 16 in the top wall of the housing. On one side of the control panel a combined off-on switch and volume control 25 is mounted, which is operated by the control 12 at the top of the housing. On the other side of the control panel 21 a tuner 26 is supported, and this is operated by the control member 13 at the top of the housing and at the side opposite to control 12.

Figure 5:
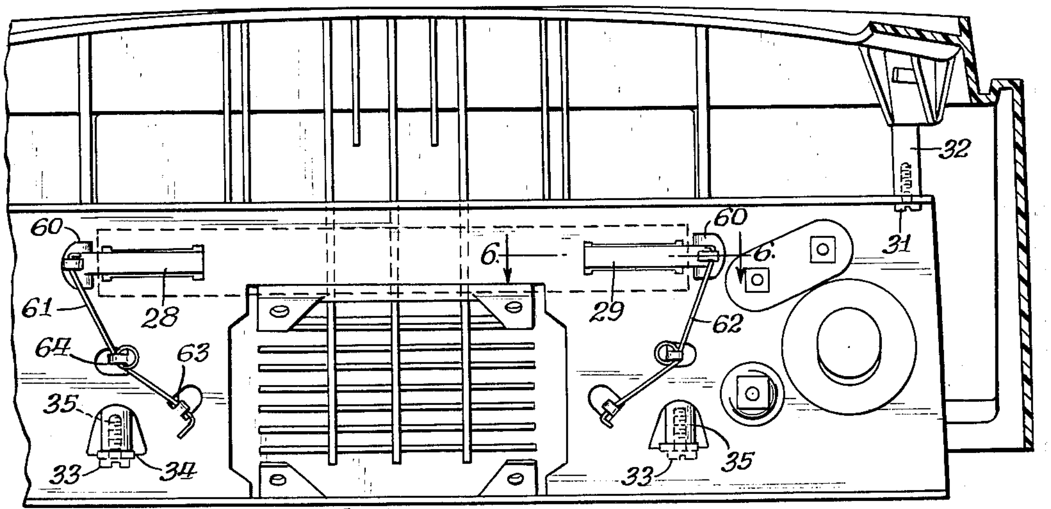
FIG. 5 is a cross-sectional view taken along lines 5—5 of FIG. 3 showing the mounting of the control panel.

As best shown in FIGS. 3 and 5 the control panel is secured to the top wall of the housing 10 by screws 31 which pass through openings on either side of the front turned down edge of the control panel, and which thread into bosses 32 formed into the top wall of the plastic housing 10. The control panel is also secured to the top wall of the housing by screws 33 which extend through openings in upwardly extending lips 34 punched in the control panel. The screws 33 are threaded into bosses 35 formed on the top wall of the plastic housing. Screws 36 are also provided through openings 37 in the recess under the handle, which are threaded into openings 38 in the control panel. Mounting of the control panel on the top wall of the housing at a plurality of points provides a rigid connection between the control panel and the housing which holds the control panel rigidly in place and serves to stiffen the top wall of the housing to strengthen the same.

As shown in FIG. 2, the chassis 20 is shaped to fit in the bottom of the cabinet, about the picture tube. The front of the chassis is recessed at the center as shown at 39 to provide clearance with the picture tube. The back corners 40 are cut off to fit within the slanting corners 41 of the back cover 18. This makes for a compact unit with a desirable housing figuration. The chassis is supported on the bottom of the housing 10 by screws 42 and 43 which extend through the bottom wall and are threaded into lugs 44 and 45 respectively provided at the edges of the chassis. The screws 42 are provided on each side at the front and the screws 43 are provided at each side at the back of the chassis, with the four point connection securely holding the chassis in place. The openings for the screws 42 and 43 are aligned so that the screws may be removed and the chassis slid backward until the screw 43 is aligned with the lug 44. The chassis may be supported in this position for servicing and in this position substantially all the components are available for inspection from the bottom.

It is pointed out that a number of slots 46 are provided in the bottom wall of the housing 10 to adequately ventilate the chassis so that the components thereon do not become unduly hot. Although the slots weaken the bottom of the housing, the secure mounting of the chassis to the bottom overcomes this and provides the strength required.

Figure 4:
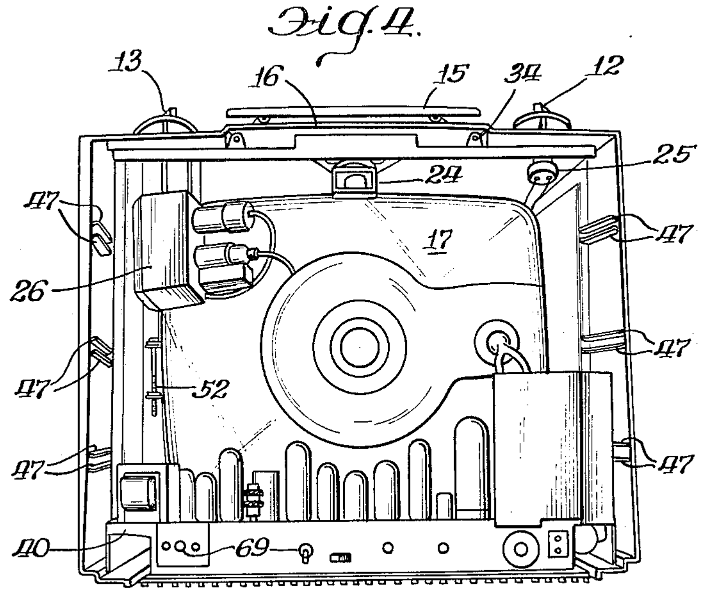
FIG. 4 is a back view of the receiver with the back cover removed.

As shown in FIGS. 2, 3 and 4, reinforcing ribs 47 are provided along the side walls of the housing to provide the required rigidity.

Figure 7:
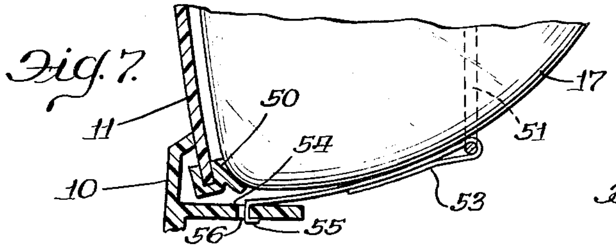
FIG. 7 is a fragmentary cross-sectional view showing the mounting of the picture tube in the housing.

The picture tube 17 is supported directly from the front of the housing 10. A sealing gasket 50 surrounds the edge of the safety panel 11 and positions the same with respect to the face plate of tube 17. The safety panel rests against the front edge of the housing 10 as shown in FIGS. 3 and 7. The tube is supported by a retaining harness including a ring 51 surrounding the tube, and which is tightened by the turn buckle structure 52 shown in FIG. 4. The ring 51 is secured by straps 53 which engage projections 54 molded on the housing 10. The straps 53 have hooked ends 55 which are connected in slots 56 formed in the projections 54. Accordingly the picture tube 17 is supported in the housing independently of the chassis 20 and the control panel 21.

Figure 6:
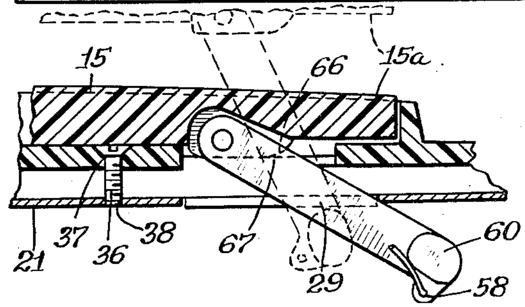
FIG. 6 is a fragmentary cross-sectional view showing the handle construction.

The construction of the handle is best shown in FIGS. 2, 5 and 6. The carrying portion of the handle 15 is supported by pivoted arms 28 and 29 which extend through openings in the top wall of the main housing 10 and in the control panel 21. When the handle is lifted the pivoted arms tend to straighten as shown in dotted lines in FIG. 6, and the projections 60 which extend on either side of the arms bear against the bottom surface of the control panel. The handle lifts the control panel which is secured to the top wall of the housing as previously described, and thereby lifts the housing and the receiver. When the handle is released, springs 61 and 62, held in place by lips 63 and 64 on the panel 21, and threaded into openings 58 in the arms 28 and 29, urge the arm into retracted positions as shown in FIG. 6. Accordingly, when the handle is released it drops into the retracted position. The springs 61 and 62 are formed by wire which is bent to engage the lips 63 and 64. A loop is provided in the wire about the lip 64 which acts as a coil spring to increase the spring action which positions the arms in the retracted out of the way position.

A recess 65 is provided in the top wall of housing 10 to receive the carrying portion 15 of the handle. In this position it is out of the way and does not obstruct the passage of sound to the opening 16. This is clearly shown in FIG. 3. The portion 15 has a projection 66 which engages a recessed portion 67 of the top wall of the housing 19 so that when the end **15*a* of the handle 15 is depressed, the opposite end raises to facilitate gripping the handle. This action is possible because of the clearance between the end 15*a*** of the handle and top wall of the housing.

The portable receiver is completely enclosed by securing the back cover 18 to the main housing 10. The back cover is molded of insulating plastic material and is shaped to surround the chassis at the bottom, with slanted sides 41 shaped to mate with the corners of the chassis, as previously stated. Openings 68 are provided along the back to provide access to controls 69 on the back of the chassis. A cup 70 extends from the back of the cover to receive the end of the picture tube. Ventilating openings 71 are provided in the back cover to allow free circulation of air within the housing so that the receiver components do not become unduly heated.

The back cover also includes a portion 72 specially designed to receive a telescopic antenna 73. Connections 74 are also provided on the back cover for connecting an external antenna to the receiver if desired. Power is applied to the receiver through a connector 75 secured to the back cover, and which couples with connector 76 on chassis 20. This prevents the connection of power to the chassis except when the back cover is in position, to thereby prevent energization of the chassis when it is exposed so that accidental contact will not cause electrical shock.

The back cover 18 is secured to the main housing 10 by screws 78 extending through projections 79 provided at the bottom of the back cover, and which are threaded into bosses provided in the bottom wall of the housing 10. Also projecting extensions 80 are provided along the bottom of the cover 18 which extend under the back edge 81 of the bottom wall of the housing. The back cover is secured to the control panel 21 by screws 82 extending through openings 83 along the top of the back cover which are threaded into the openings 84 in the back down turned edge of the control panel. This secures the top of the back cover to the housing through the control panel. The housing 10 has a portion 85 extending back of the openings 16 to engage the top 86 of the back cover. These portions are constructed so that an interference fit therebetween is presented, that is a wedging action occurs therebetween which holds the parts in rigid engagement. This is advantageous as it holds the top of the cabinet having the sound openings 16 therein, and also the top of the back cover, against vibration or rattling resulting from the sound emitted by the loudspeaker 24.

It is therefore seen that a portable television receiver is provided which is extremely compact and light weight. The plastic housing itself is light weight and prevents the posssibility of electrical shock from occurring through contact with the housing. The operating parts of the receiver, that is the picture tube, chassis and control panel are all mounted directly to the housing, and the separate frame usually provided for such components is eliminated. This is an important factor in reducing the weight of the receiver. The arrangement of the control panel at the top wall of the receiver serves to position the controls and the loudspeaker in advantageous position on the receiver housing. Further this control panel serves to strengthen the top wall of the receiver, so that adequate support is provided for the retractable handle secured thereto for carrying the receiver. The handle is retracted to an out of the way position when not being used and does not adversely affect the appearance of the receiver nor interfere in any way with the operation of the receiver.

What is claimed is:

1. A portable television receiver including in combination, a molded plastic housing having top, bottom and side walls and a front wall having an opening therein, a television picture tube secured to and supported by said housing and having a viewing screen positioned at said opening in said front wall, a chassis secured to and supported by said bottom wall within said housing, a control panel secured only to said housing independently of said chassis and positioned at the under side of said top wall thereof, a handle having portions extending through said top wall and secured to said control panel, and a back cover for closing said housing and secured at the bottom thereof to said housing and at the top thereof to said control panel, whereby said housing provides mechanical mounting for individually mounting each of said cathode ray tube, chassis, and panel, with no other mechanical connection therebetween.

2. A portable television receiver including in combination, an insulating molded plastic housing including top, bottom and side walls and a front wall having an opening therein, a television picture tube having a screen positioned for viewing through said opening in said front wall of said housing, said picture tube having support means thereon secured to the inside of said front wall and holding the perimeter of said screen of said picture tube against the inside of said front wall at the perimeter of the opening therein to support said picture tube directly on said housing, a chassis within said housing secured to and supported by the bottom wall thereof, a control panel within said housing and secured only to the top wall thereof independently of said chassis, control means secured to said panel and having operating elements extending through said top wall, a retractable handle having portions extending through said top wall and secured to said control panel, and an insulating molded plastic back cover for closing said housing and secured at the bottom thereof to said housing and at the top thereof to said control panel, whereby said housing provides mechanical mounting for individually mounting each of said cathode ray tube, chassis, and panel, with no other mechanical connection therebetween.

3. A portable television receiver including in combination, a molded plastic housing having top, bottom and side walls and a front wall having an opening therein, a television picture tube secured within said housing and having a viewing screen positioned adjacent said opening in said front wall thereof, a chassis within said housing and secured to said bottom wall thereof, a control panel within said housing and secured to said top wall thereof, tuner and control means supported on said control panel and including control elements extending through openings in said top wall and accessible at the top of said housing, loudspeaker means on said control panel, said top wall having openings therein for passage therethrough of sound from said loudspeaker means, a retractable handle having portions extending through said top wall and secured to said control panel, and a back cover for closing said housing and secured at the bottom thereof to said housing and at the top thereof to said control panel, said back cover engaging the top wall of said housing with an interference fit to prevent rattling due to vibrations produced by said loud speaker means.

4. A portable television receiver including in combination housing means having top, bottom and side walls and a front wall having an opening therein, a television picture tube secured to and supported by said housing immediately beneath said top wall and having a screen positioned for viewing at said opening in said front wall of said housing, a panel secured to the underside of said top wall, control means within said housing and including control elements extending through openings in said housing and accessible from the outside thereof, and a retractable handle having a carrying member and supporting portions pivoted thereto which extend through said top wall and said panel and engage the lower side of said panel, said panel being of a size sufficient to distribute the load force of said carrying handle, when said receiver is being carried, over a sufficiently large area of said top wall to prevent damage thereto, and spring means on said top wall engaging said supporting portions and biasing the same in retracted positions outwardly of said cathode ray tube for clearing the same.

5. A portable television receiver including in combination, a molded plastic insulating housing having top, bottom and side walls and a front wall having a viewing opening therein, a transparent safety panel positioned within said housing across said viewing opening, a television picture tube having a viewing screen, means securing said picture tube to said housing with said screen positioned for viewing at said opening in said front wall of said housing, a chassis within said housing and secured to and supported by said bottom wall thereof, a control panel within said housing and secured to the underside of said top wall thereof, said chassis and said control panel serving to strengthen said housing and being individually supported by said housing independently of each other, tuner and control means secured to said control panel adjacent the ends thereof and including control elements extending through openings in said top wall and accessible at the top of said housing, loudspeaker means secured to said control panel at the central portion thereof, said top wall having sound openings therein adjacent said loudspeaker means for passage therethrough of sound, a retractable handle having a carrying member and support portions pivoted thereto which extend through said top wall and engage said control panel, spring means on said control panel coupled to said handle portion for holding the same in retracted position, said top wall having a recess therein forward of said sound openings for receiving at least a portion of said carrying member when said handle is in retracted position, a molded plastic insulating back cover for closing said housing, and means securing said back cover at the bottom thereof to said housing and at the top thereof to said control panel, said back cover having a top portion engaging said top wall of said housing with an interference fit.

References Cited by the Examiner

UNITED STATES PATENTS

| | | | |
|---|---|---|---|
| 2,436,598 | 2/1948 | Pastor et al. | 16—112 |
| 2,917,577 | 12/1959 | Harmon et al. | 178—7.9 |
| 2,986,600 | 5/1961 | Pifer | 178—7.9 |
| 3,087,013 | 4/1963 | Stastny et al. | 178—7.82 |

FOREIGN PATENTS

| | | |
|---|---|---|
| 819,321 | 7/1937 | France. |
| 291,616 | 6/1928 | Great Britain. |

DAVID G. REDINBAUGH, *Primary Examiner.*

J. A. O'BRIEN, *Assistant Examiner.*